(12) United States Patent
El-Kahlout et al.

(10) Patent No.: US 11,613,493 B2
(45) Date of Patent: Mar. 28, 2023

(54) METHOD OF MAKING HIGH QUALITY HEAT-RESISTANT ROLLS

(71) Applicant: Corning Incorporated, Corning, NY (US)

(72) Inventors: Ahdi El-Kahlout, Lexington, KY (US); Tuan Quoc Nguyen, Danville, KY (US)

(73) Assignee: Corning Incorporated, Corning, NY (US)

( * ) Notice: Subject to any disclaimer, the term of this patent is extended or adjusted under 35 U.S.C. 154(b) by 1071 days.

(21) Appl. No.: 16/320,377

(22) PCT Filed: Jul. 20, 2017

(86) PCT No.: PCT/US2017/043184
§ 371 (c)(1),
(2) Date: Jan. 24, 2019

(87) PCT Pub. No.: WO2018/022435
PCT Pub. Date: Feb. 1, 2018

(65) Prior Publication Data
US 2019/0263710 A1    Aug. 29, 2019

Related U.S. Application Data

(60) Provisional application No. 62/366,784, filed on Jul. 26, 2016.

(51) Int. Cl.
C03B 35/18 (2006.01)
C03B 17/06 (2006.01)
B32B 5/02 (2006.01)

(52) U.S. Cl.
CPC ............. *C03B 35/183* (2013.01); *B32B 5/02* (2013.01); *C03B 17/068* (2013.01); *C03B 35/181* (2013.01); *C03B 35/189* (2013.01)

(58) Field of Classification Search
CPC ........ B65G 39/00; B65H 27/00; C03B 13/16; C03B 35/189
See application file for complete search history.

(56) References Cited

U.S. PATENT DOCUMENTS

| 3,116,053 A | 12/1963 | Gustaf |
| 6,896,646 B2 | 5/2005 | Kaiser et al. |

(Continued)

FOREIGN PATENT DOCUMENTS

| CN | 101010262 A | 8/2007 |
| CN | 101560048 A | 10/2009 |

(Continued)

OTHER PUBLICATIONS

Kaowool 822 and 830 Product Information sheet (https://web.archive.org/web/20080723164325/https://www.fabricationspecialties.com/pdf/millboard.pdf), Jul. 23, 2008.*

(Continued)

*Primary Examiner* — Erin Snelting
(74) *Attorney, Agent, or Firm* — Matthew J. Mason

(57) ABSTRACT

A method for making a heat-resistant roll includes pre-selecting a plurality of heat-resistant disks and pressing at least a selected portion of the pre-selected disks together such that a total axial thickness of the pressed disks relative to a total axial thickness of the selected disks prior to pressing is within a predetermined range.

21 Claims, 2 Drawing Sheets

(56) References Cited

U.S. PATENT DOCUMENTS

| | | | |
|---|---|---|---|
| 7,430,880 B2 | 10/2008 | Butts et al. | |
| 7,507,194 B2 | 3/2009 | Neubauer et al. | |
| 7,624,646 B2 * | 12/2009 | Neubauer | G01N 3/08 |
| | | | 492/40 |
| 7,842,632 B2 | 11/2010 | Neubauer et al. | |
| 8,024,985 B2 | 9/2011 | Neubauer | |
| 8,261,448 B2 | 9/2012 | Neubauer et al. | |
| 8,303,377 B2 | 11/2012 | Nakayama et al. | |
| 8,359,887 B2 | 1/2013 | Bisson et al. | |
| 8,549,753 B2 * | 10/2013 | Neubauer | F16C 13/00 |
| | | | 29/895.23 |
| 8,769,821 B2 | 7/2014 | Neubauer | |
| 8,820,120 B2 * | 9/2014 | Cook | C03B 17/068 |
| | | | 65/370.1 |
| 8,827,883 B2 | 9/2014 | Horiuchi et al. | |
| 8,991,216 B2 | 3/2015 | Gallagher et al. | |
| 9,016,093 B2 | 4/2015 | Ahmed et al. | |
| 9,388,008 B2 * | 7/2016 | Horiuchi | B65H 27/00 |
| 9,604,865 B2 | 3/2017 | Horiuchi et al. | |
| 9,604,867 B2 | 3/2017 | Nakayama et al. | |
| 2005/0212158 A1 | 9/2005 | Kaiser | |
| 2010/0064729 A1 * | 3/2010 | Nakayama | C03B 35/183 |
| | | | 264/293 |
| 2011/0287915 A1 * | 11/2011 | Horiuchi | B65H 27/00 |
| | | | 492/40 |
| 2012/0272686 A1 † | 11/2012 | Horiuchi | |
| 2012/0298476 A1 * | 11/2012 | Nakayama | C03B 35/189 |
| | | | 451/49 |
| 2013/0174609 A1 * | 7/2013 | Watanabe | C03B 35/181 |
| | | | 264/681 |
| 2017/0183252 A1 | 6/2017 | Nakayama et al. | |
| 2019/0263710 A1 * | 8/2019 | El-Kahlout | C03B 35/183 |
| 2019/0375669 A1 * | 12/2019 | Delia | C03B 25/12 |

FOREIGN PATENT DOCUMENTS

| | | | | |
|---|---|---|---|---|
| CN | 101676235 A | 3/2010 | | |
| CN | 101733819 A | 6/2010 | | |
| CN | 101792250 A | 8/2010 | | |
| CN | 101885578 A | 11/2010 | | |
| CN | 103963143 A | 8/2014 | | |
| CN | 104039722 A | 9/2014 | | |
| EP | 1795505 A1 | 6/2007 | | |
| JP | H06-279834 A † | 10/1994 | | |
| JP | 2006-069825 A | 3/2006 | | |
| JP | 2010-095437 A | 4/2010 | | |
| JP | 2010-111541 A | 5/2010 | | |
| JP | 2010-155777 A | 7/2010 | | |
| JP | 2010-265167 A | 11/2010 | | |
| JP | 2013-018681 A | 1/2013 | | |
| JP | 5452752 B1 * | 3/2014 | | C03B 35/181 |
| JP | 7035009 B2 * | 3/2022 | | B32B 37/10 |
| TW | 201016623 A | 5/2010 | | |
| TW | 201018631 A | 5/2010 | | |
| TW | 201335081 A | 9/2013 | | |
| WO | 2012/050654 A2 | 4/2012 | | |
| WO | 2013/102950 A1 | 7/2013 | | |
| WO | WO-2015040796 A1 * | 3/2015 | | B24B 7/241 |

OTHER PUBLICATIONS

International Search Report and Written Opinion of the International Searching Authority; PCT/US2017/043184; dated Oct. 13, 2017; 8 Pages; ISA/US Commissioner for Patents.

Japanese Patent Application No. 2019-503929, Office Action dated May 12, 2021, 7 pages (English Translation Only), Japanese Patent Office.

Taiwanese Patent Application No. 106124817 Summary of Official Letter dated Dec. 16, 2020; 3 Pages; (English Translation Only); Taiwanese Patent Office.

Chinese Patent Application No. 201780046708.2, Office Action dated Jun. 24, 2021, 11 pages (4 pages of English Translation and 7 pages of Original Document), Chinese Patent Office.

\* cited by examiner
† cited by third party

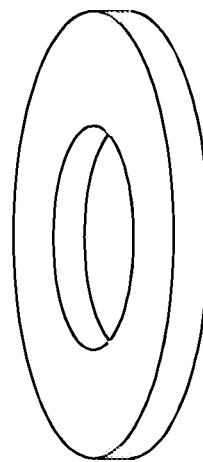  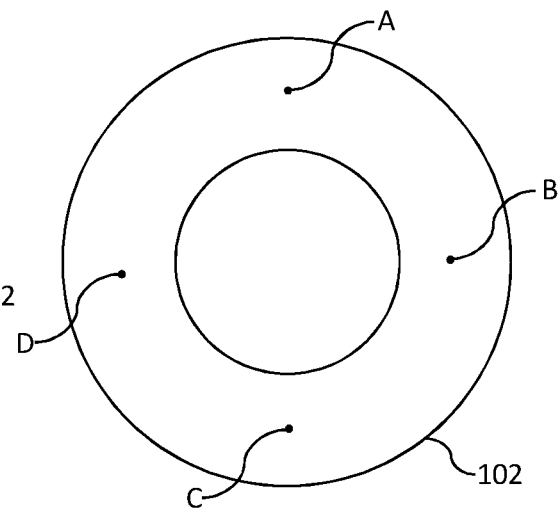
FIG. 2A  FIG. 2B  FIG. 2C
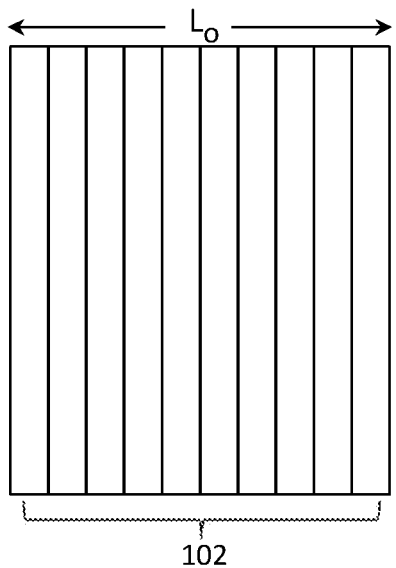 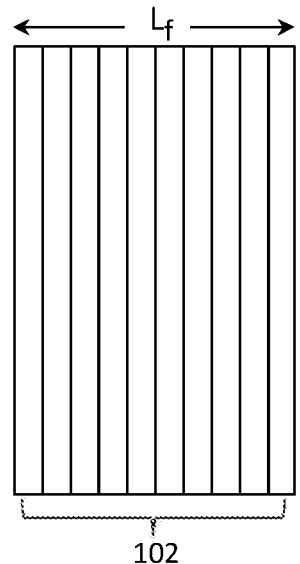
FIG. 3A  FIG. 3B

METHOD OF MAKING HIGH QUALITY HEAT-RESISTANT ROLLS

CROSS-REFERENCE TO RELATED APPLICATIONS

This application is a National Stage application under 35 U.S.C. § 371 of International Application No. PCT/US2017/043184, filed on Jul. 20, 2017, which claims the benefit of priority to U.S. Provisional Application No. 62/366,784 filed Jul. 26, 2016, the contents of which are incorporated herein by reference in their entireties.

FIELD

The present disclosure relates generally to methods for making heat-resistant rolls and more particularly to methods for making heat-resistant rolls with improved quality.

BACKGROUND

In the production of glass articles, such as glass sheets for display applications, including televisions and hand held devices, such as telephones and tablets, heat-resistant rolls are often used in the glass drawing process, such as the fusion down draw process. Because these rolls typically operate at relatively high temperatures in a generally contained environment, it is desirable that they not only perform well at elevated temperatures for extended periods but also that they release low levels of particles that may adhere to the glass surface and possess properties allowing for application of forces on the glass without cracking or breaking the glass.

Methods for making heat-resistant rolls include pressing disks of heat-resistant material together and then cutting the pressed disks into the desired geometry. However, prior methods for making heat-resistant rolls have not taken into account certain processing parameters and conditions that can enable the consistent production of heat-resistant rolls with superior properties, such as measured hardness and high surface quality (e.g., surfaces with low defect incidence).

SUMMARY

Embodiments disclosed herein include a method for making a heat-resistant roll. The method includes pre-selecting a plurality of heat-resistant disks. The method also includes pressing at least a selected portion of the pre-selected disks together, such that a total axial thickness of the pressed disks relative to a total axial thickness of the selected disks prior to pressing is within a predetermined range.

Additional features and advantages of the embodiments disclosed herein will be set forth in the detailed description which follows, and in part will be readily apparent to those skilled in the art from that description or recognized by practicing the disclosed embodiments as described herein, including the detailed description which follows, the claims, as well as the appended drawings.

It is to be understood that both the foregoing general description and the following detailed description present embodiments intended to provide an overview or framework for understanding the nature and character of the claimed embodiments. The accompanying drawings are included to provide further understanding, and are incorporated into and constitute a part of this specification. The drawings illustrate various embodiments of the disclosure, and together with the description serve to explain the principles and operations thereof.

BRIEF DESCRIPTION OF THE DRAWINGS

FIGS. 2A, 2B, and 2C are, respectively, perspective, side, and front views of a heat-resistant disk according to embodiments disclosed herein; and FIGS. 3A and 3B are, respectively, side views of a plurality of disks prior to and subsequent to pressing according to embodiments disclosed herein.

DETAILED DESCRIPTION

Figure 1:
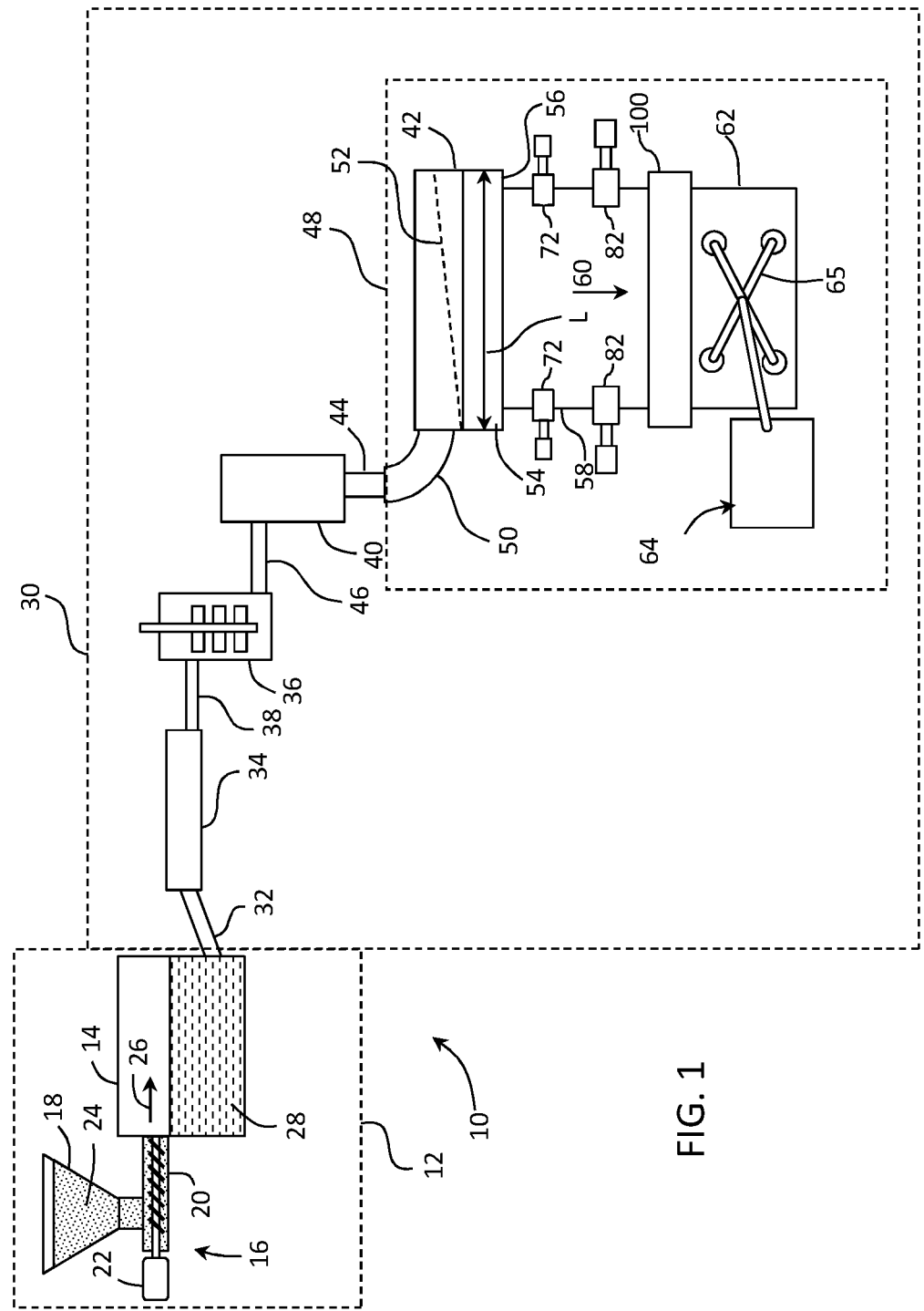
FIG. 1 is a schematic view of an example fusion down draw glass making apparatus and process.

Reference will now be made in detail to the present preferred embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

Ranges can be expressed herein as from "about" one particular value, and/or to "about" another particular value. When such a range is expressed, another embodiment includes from the one particular value and/or to the other particular value. Similarly, when values are expressed as approximations, for example by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

As used herein, the term "pre-selecting a plurality of heat-resistant disks" refers to selecting a plurality of disks from a larger collection of disks, wherein criteria for selecting the plurality of disks is based on at least one predetermined characteristic of the disks, such as at least one quality factor as described herein.

Shown in FIG. 1 is an exemplary glass manufacturing apparatus 10. In some examples, the glass manufacturing apparatus 10 can comprise a glass melting furnace 12 that can include a melting vessel 14. In addition to melting vessel 14, glass melting furnace 12 can optionally include one or more additional components such as heating elements (e.g., combustion burners or electrodes) that heat raw materials and convert the raw materials into molten glass. In further examples, glass melting furnace 12 may include thermal management devices (e.g., insulation components) that reduce heat lost from a vicinity of the melting vessel. In still further examples, glass melting furnace 12 may include electronic devices and/or electromechanical devices that facilitate melting of the raw materials into a glass melt. Still further, glass melting furnace 12 may include support structures (e.g., support chassis, support member, etc.) or other components.

Glass melting vessel 14 is typically comprised of refractory material, such as a refractory ceramic material, for example a refractory ceramic material comprising alumina or zirconia. In some examples glass melting vessel 14 may be constructed from refractory ceramic bricks. Specific embodiments of glass melting vessel 14 will be described in more detail below.

In some examples, the glass melting furnace may be incorporated as a component of a glass manufacturing apparatus to fabricate a glass substrate, for example a glass ribbon of a continuous length. In some examples, the glass melting furnace of the disclosure may be incorporated as a component of a glass manufacturing apparatus comprising a slot draw apparatus, a float bath apparatus, a down-draw apparatus such as a fusion process, an up-draw apparatus, a press-rolling apparatus, a tube drawing apparatus or any other glass manufacturing apparatus that would benefit from the aspects disclosed herein. By way of example, FIG. 1 schematically illustrates glass melting furnace 12 as a component of a fusion down-draw glass manufacturing apparatus 10 for fusion drawing a glass ribbon for subsequent processing into individual glass sheets.

The glass manufacturing apparatus 10 (e.g., fusion down-draw apparatus 10) can optionally include an upstream glass manufacturing apparatus 16 that is positioned upstream relative to glass melting vessel 14. In some examples, a portion of, or the entire upstream glass manufacturing apparatus 16, may be incorporated as part of the glass melting furnace 12.

As shown in the illustrated example, the upstream glass manufacturing apparatus 16 can include a storage bin 18, a raw material delivery device 20 and a motor 22 connected to the raw material delivery device. Storage bin 18 may be configured to store a quantity of raw materials 24 that can be fed into melting vessel 14 of glass melting furnace 12, as indicated by arrow 26. Raw materials 24 typically comprise one or more glass forming metal oxides and one or more modifying agents. In some examples, raw material delivery device 20 can be powered by motor 22 such that raw material delivery device 20 delivers a predetermined amount of raw materials 24 from the storage bin 18 to melting vessel 14. In further examples, motor 22 can power raw material delivery device 20 to introduce raw materials 24 at a controlled rate based on a level of molten glass sensed downstream from melting vessel 14. Raw materials 24 within melting vessel 14 can thereafter be heated to form molten glass 28.

Glass manufacturing apparatus 10 can also optionally include a downstream glass manufacturing apparatus 30 positioned downstream relative to glass melting furnace 12. In some examples, a portion of downstream glass manufacturing apparatus 30 may be incorporated as part of glass melting furnace 12. In some instances, first connecting conduit 32 discussed below, or other portions of the downstream glass manufacturing apparatus 30, may be incorporated as part of glass melting furnace 12. Elements of the downstream glass manufacturing apparatus, including first connecting conduit 32, may be formed from a precious metal. Suitable precious metals include platinum group metals selected from the group of metals consisting of platinum, iridium, rhodium, osmium, ruthenium and palladium, or alloys thereof. For example, downstream components of the glass manufacturing apparatus may be formed from a platinum-rhodium alloy including from about 70 to about 90% by weight platinum and about 10% to about 30% by weight rhodium. However, other suitable metals can include molybdenum, palladium, rhenium, tantalum, titanium, tungsten and alloys thereof.

Downstream glass manufacturing apparatus 30 can include a first conditioning (i.e., processing) vessel, such as fining vessel 34, located downstream from melting vessel 14 and coupled to melting vessel 14 by way of the above-referenced first connecting conduit 32. In some examples, molten glass 28 may be gravity fed from melting vessel 14 to fining vessel 34 by way of first connecting conduit 32. For instance, gravity may cause molten glass 28 to pass through an interior pathway of first connecting conduit 32 from melting vessel 14 to fining vessel 34. It should be understood, however, that other conditioning vessels may be positioned downstream of melting vessel 14, for example between melting vessel 14 and fining vessel 34. In some embodiments, a conditioning vessel may be employed between the melting vessel and the fining vessel wherein molten glass from a primary melting vessel is further heated to continue the melting process, or cooled to a temperature lower than the temperature of the molten glass in the melting vessel before entering the fining vessel.

Bubbles may be removed from molten glass 28 within fining vessel 34 by various techniques. For example, raw materials 24 may include multivalent compounds (i.e. fining agents) such as tin oxide that, when heated, undergo a chemical reduction reaction and release oxygen. Other suitable fining agents include without limitation arsenic, antimony, iron and cerium. Fining vessel 34 is heated to a temperature greater than the melting vessel temperature, thereby heating the molten glass and the fining agent. Oxygen bubbles produced by the temperature-induced chemical reduction of the fining agent(s) rise through the molten glass within the fining vessel, wherein gases in the molten glass produced in the melting furnace can diffuse or coalesce into the oxygen bubbles produced by the fining agent. The enlarged gas bubbles can then rise to a free surface of the molten glass in the fining vessel and thereafter be vented out of the fining vessel. The oxygen bubbles can further induce mechanical mixing of the molten glass in the fining vessel.

Downstream glass manufacturing apparatus 30 can further include another conditioning vessel such as a mixing vessel 36 for mixing the molten glass. Mixing vessel 36 may be located downstream from the fining vessel 34. Mixing vessel 36 can be used to provide a homogenous glass melt composition, thereby reducing cords of chemical or thermal inhomogeneity that may otherwise exist within the fined molten glass exiting the fining vessel. As shown, fining vessel 34 may be coupled to mixing vessel 36 by way of a second connecting conduit 38. In some examples, molten glass 28 may be gravity fed from the fining vessel 34 to mixing vessel 36 by way of second connecting conduit 38. For instance, gravity may cause molten glass 28 to pass through an interior pathway of second connecting conduit 38 from fining vessel 34 to mixing vessel 36. It should be noted that while mixing vessel 36 is shown downstream of fining vessel 34, mixing vessel 36 may be positioned upstream from fining vessel 34. In some embodiments, downstream glass manufacturing apparatus 30 may include multiple mixing vessels, for example a mixing vessel upstream from fining vessel 34 and a mixing vessel downstream from fining vessel 34. These multiple mixing vessels may be of the same design, or they may be of different designs.

Downstream glass manufacturing apparatus 30 can further include another conditioning vessel such as delivery vessel 40 that may be located downstream from mixing vessel 36. Delivery vessel 40 may condition molten glass 28 to be fed into a downstream forming device. For instance, delivery vessel 40 can act as an accumulator and/or flow controller to adjust and/or provide a consistent flow of molten glass 28 to forming body 42 by way of exit conduit 44. As shown, mixing vessel 36 may be coupled to delivery vessel 40 by way of third connecting conduit 46. In some examples, molten glass 28 may be gravity fed from mixing vessel 36 to delivery vessel 40 by way of third connecting conduit 46. For instance, gravity may drive molten glass 28 through an interior pathway of third connecting conduit 46 from mixing vessel 36 to delivery vessel 40.

Downstream glass manufacturing apparatus 30 can further include forming apparatus 48 comprising the above-referenced forming body 42 and inlet conduit 50. Exit conduit 44 can be positioned to deliver molten glass 28 from delivery vessel 40 to inlet conduit 50 of forming apparatus 48. For example in examples, exit conduit 44 may be nested within and spaced apart from an inner surface of inlet conduit 50, thereby providing a free surface of molten glass positioned between the outer surface of exit conduit 44 and the inner surface of inlet conduit 50. Forming body 42 in a fusion down draw glass making apparatus can comprise a trough 52 positioned in an upper surface of the forming body and converging forming surfaces 54 that converge in a draw direction along a bottom edge 56 of the forming body. Molten glass delivered to the forming body trough via delivery vessel 40, exit conduit 44 and inlet conduit 50 overflows side walls of the trough and descends along the converging forming surfaces 54 as separate flows of molten glass. The separate flows of molten glass join below and along bottom edge 56 to produce a single ribbon of glass 58 that is drawn in a draw direction 60 from bottom edge 56 by applying tension to the glass ribbon, such as by gravity, edge rolls 72 and pulling rolls 82, to control the dimensions of the glass ribbon as the glass cools and a viscosity of the glass increases. Accordingly, glass ribbon 58 goes through a visco-elastic transition and acquires mechanical properties that give the glass ribbon 58 stable dimensional characteristics. Glass ribbon 58 may, in some embodiments, be separated into individual glass sheets 62 by a glass separation apparatus 100 in an elastic region of the glass ribbon. A robot 64 may then transfer the individual glass sheets 62 to a conveyor system using gripping tool 65, whereupon the individual glass sheets may be further processed.

FIGS. 2A, 2B, and 2C are, respectively, perspective, side, and front views of a heat-resistant disk 102 according to embodiments disclosed herein. The axial thickness of heat-resistant disk 102 is indicated by T in FIG. 2B. An axial thickness of heat-resistant disk 102 can be measured, for example, by measuring the thickness of the disk on a location on the disk. An average axial thickness of heat-resistant disk 102 can be measured, for example, by measuring the thickness of the disk for at least two locations on the disk, such as at least three locations on the disk, and further such as at least four locations on the disk and so forth and then dividing the total thickness of all of the measurements by the number of measurements.

For example, FIG. 2C shows an embodiment where an average axial thickness of heat-resistant disk 102 is measured by measuring an axial thickness of the disk for four locations on the disk, indicated in FIG. 2C as A, B, C, and D, wherein A, B, C, and D are approximately equally spaced apart from each other and wherein A, B, C, and D are each approximately radially equidistant between an inner and outer radius of the disk material. In the embodiment shown in FIG. 2C, an average axial thickness of disk 102 can be obtained by summing the measured axial thickness at locations A, B, C, and D and then dividing the sum by four.

In embodiments disclosed herein, the average axial thickness of heat-resistant disks, while not limited, may range, for example from about 4 to about 8 millimeters, such from about 5 to about 7 millimeters, and further such as from about 5.5 to about 6.5 millimeters, including about 6 millimeters. Such disks may, for example, have an outer diameter of from about 50 to about 180 millimeters, such as from about 100 to about 150 millimeters, including about 140 millimeters and a center aperture having a diameter of from about 25 to about 90 millimeters, such as from about 50 to about 70 millimeters, including about 64 millimeters.

Materials for heat-resistant disks, while not limited, should be able to withstand high temperature environments (e.g., temperatures in excess of 500° C.) for extended periods of time. Suitable materials for heat-resistant disks that may be useful for embodiments disclosed herein include, for example, composites of clay, mica, glass fibers, and cellulose fibers as disclosed, for example, in U.S. Pat. No. 6,896,646 the entire disclosure of which is incorporated herein by reference. For example, the heat-resistant disks may comprise a composite having the above composition that is commercially available form Nichias Corporation of Tokyo, Japan under the product designation SD-115. This product is supplied in sheets having a thickness of about 6 millimeters and can be cut into discs having a circular outer perimeter (e.g., a diameter of about 140 mm), and a center aperture (e.g., a circular aperture having a diameter of about 64 millimeters) using, for example, a water jet cutter or an appropriately sized punch.

Alternatively, sheets of the composite can be prepared by, for example: (1) forming a water slurry of clay (e.g., GLOMAX LL), mica, glass fibers (e.g., 10 wt. % $Al_2O_3$—$SiO_2$ fibers), wood fiber (e.g., HIBRITE from Canada), and starch; (2) forming layers from the slurry using a rotary drum "paper making" machine; (3) stacking the layers (e.g., 20 layers) to make a millboard 6 mm thick; (4) draping the millboard over a drying rack to air dry for at least 24 hours; and (5) placing the drying rack in an oven at 110° C. for 24 hours.

Other materials for heat-resistant disks that may be useful for embodiments disclosed herein include, for example, millboard materials that comprise aluminosilicate refractory fiber, silicate, mica, and kaolin clay as disclosed, for example, in U.S. Pat. No. 7,507,194, the entire disclosure of which is incorporated herein by reference. For example, the heat-resistant disks may comprise a millboard material comprising from about 5 to about 30 parts by weight aluminosilicate refractory fiber; from about 10 to about 30 parts by weight silicate, from about 5 to about 25 parts by weight mica; and from about 10 to about 35 parts by weight kaolin clay; wherein the combination of the above constituents comprise at least 85 weight percent of the millboard material.

Embodiments disclosed herein include methods for making heat-resistant rolls, wherein the method includes pre-selecting a plurality of heat-resistant disks. Such disks may be pre-selected from any of the heat-resistant disk materials described herein. The plurality of pre-selected heat-resistant disks may be selected based on at least one quality factor.

The at least one quality factor may, for example, be selected from the group consisting of surface wrinkle density, surface wrinkle spacing, surface wrinkle depth, and void density.

In certain exemplary embodiments, each of the plurality of pre-selected heat resistant disks has a surface wrinkle density of less than about 5 visible wrinkles, such as less than about 4 visible wrinkles, and further such as less than about 3 visible wrinkles, and yet further such as less than about 2 visible wrinkles, and still yet further such as less than about 1 visible wrinkle for any 2,000 square millimeter area of the surface of the disk The term "visible wrinkle" refers to a wrinkle that is visible to the naked human eye without magnification.

In certain exemplary embodiments, each of the plurality of pre-selected heat resistant disks has a surface wrinkle spacing of at least about 3 millimeters, such as at least about 4 millimeters, and further such as at least about 5 millimeters, and yet further such as at least about 6 millimeters, and still yet further such as at least about 7 millimeters between the closest visible wrinkles on the disk. The term "closest visible wrinkles" refers to the visible wrinkles on the surface of the disk that are closest to each other.

In certain exemplary embodiments, each of the plurality of pre-selected heat resistant disks has a surface wrinkle depth characteristic such that the deepest visible wrinkle on the surface of the disk has a depth of less than about 0.3 millimeters, such as less than about 0.25 millimeters, and further such as less than about 0.2 millimeters, and yet further such as less than about 0.15 millimeters, and still yet further such as less than about 0.1 millimeter. The term "wrinkle depth" refers to the vertical depth of wrinkle relative to a plane formed by a major surface of the disk.

In certain exemplary embodiments, each of the plurality of pre-selected heat resistant disks has a void density of less than two voids having a largest dimension of at least about 2 millimeters, such as less than one void having a largest dimension of at least about 2 millimeters for every 10,000 square millimeters of surface area on the disk. Each of the plurality of pre-selected heat-resistant disks may also have a void density of less than five voids having a largest dimension of at least about 1 millimeter, such as less than four voids having a largest dimension of at least about 1 millimeter, and further such as less than three voids having a largest dimension of at least about 1 millimeter, and yet further such as less than two voids having a largest dimension of at least about 1 millimeter for every 10,000 square millimeters of surface area on the disk. The term "largest dimension" refers to the largest dimension of a void along a plane formed by a major surface of the disk.

Each of the quality factors described above can be measured by a visual inspection method using, for example, a micrometer.

In certain exemplary embodiments, an average density of each of the plurality of pre-selected heat-resistant disks ranges from about 0.6 grams per cubic centimeter to about 1.2 grams per cubic centimeter, such as from about 0.7 grams per cubic center to about 1.1 grams per cubic centimeter, and further such as from about 0.8 grams per cubic centimeter to about 1 gram per cubic centimeter.

In certain exemplary embodiments, an average compressive strength of each of the plurality of pre-selected heat-resistant disks is at least about 15 newtons per square millimeter, such as from about 15 to about 100, and further such as from about 20 to about 95, and still further such as from about 40 to about 75 newtons per square millimeter.

Following pre-selection of a plurality of heat-resistant disks, an average axial thickness of the plurality of pre-selected heat-resistant disks can be measured using, for example, any of the measurement techniques described herein, including the measurement technique described above wherein the average axial thickness of the plurality of pre-selected heat-resistant disks is measured for at least two locations on the disk, such as the embodiment illustrated in FIG. 2C, wherein the average axial thickness is measured for four locations on the disk.

Embodiments disclosed herein also include selecting, among the measured disks, at least two disks, such as a plurality of disks, having an average axial thickness within a predetermined range. The predetermined range for the average axial thickness, while not limited, may, for example, range from about 4 to about 8 millimeters, such as from about 5 to about 7 millimeters, and further such as from about 5.5 to about 6.5 millimeters, including about 6 millimeters.

In certain exemplary embodiments, a difference between the largest and smallest average axial thickness of the selected disks is less than about 10%, such as less than about 9%, and further such as less than about 8%, and still yet further such as less than about 7%, and even still further such as less than about 6%, and yet ever still further such as less than about 5% of the average axial thickness of the selected disks having the largest average axial thickness.

For example, if the largest average axial thickness of any of the selected disks is about 6.4 millimeters, a less than about 10% of this thickness would be less than about 0.64 millimeters. In such an embodiment, each of the selected disks would have a diameter of no greater than about 6.4 millimeters and no less than about 5.76 millimeters, such that a difference between the largest and smallest average axial thickness of the selected disks is less than about 10% of the average axial thickness of the selected disks having the largest average axial thickness.

Similarly, if the largest average axial thickness of any of the selected disks is about 6.4 millimeters, a less than about 5% of this thickness would be less than about 0.32 millimeters. In such an embodiment, each of the selected disks would have a diameter of no greater than about 6.4 millimeters and no less than about 6.08 millimeters, such that a difference between the largest and smallest average axial thickness of the selected disks is less than about 5% of the average axial thickness of the selected disks having the largest average axial thickness.

In certain, exemplary embodiments, a difference between the highest and lowest density of the selected disks is less than about 10%, such as less than about 9%, and further such as less than about 8%, and still yet further such as less than about 7%, and even still further such as less than about 6%, and yet ever still further such as less than about 5% of the density of the selected disks having the highest density.

For example, if the highest density of any of the selected disks is about 1 gram per cubic centimeter, a less than about 10% of this density would be less than about 0.1 gram per cubic centimeter. In such an embodiment, each of the selected disks would have a density of no greater than about 1 gram per cubic centimeter and no less than about 0.9 grams per cubic centimeter, such that a difference between the highest and lowest density of the selected disks is less than about 10% of the density of the selected disks having the highest density.

Similarly, if the highest density of any of the selected disks is about 1 gram per cubic centimeter, a less than about 5% of this density would be less than about 0.05 gram per cubic centimeter. In such an embodiment, each of the selected disks would have a density of no greater than about 1 gram per cubic centimeter and no less than about 0.95 grams per cubic centimeter, such that a difference between the highest and lowest density of the selected disks is less than about 5% of the density of the selected disks having the highest density.

In certain exemplary embodiments, the selected disks may be heated in a firing step. The firing step, may, for example, comprise heating the selected disks to a temperature of from about 650° C. to about 1,000° C., such as from about 760° C. to about 1,000° C. for a period of at least two hours.

In other exemplary embodiments, the selected disks may not be heated in a firing step (e.g., the selected disks may be pressed in an-unfired or "green" state).

The selected disks may they be pressed together, such that a total axial thickness of the pressed disks relative to a total axial thickness of the selected disks prior to pressing is within a predetermined range.

In certain exemplary embodiments, the selected disks may be weighed prior to pressing. If the total or cumulative weight of the selected disks is outside of a predetermined range, then exemplary embodiments can include those in which at least one selected disk is exchanged for another pre-selected disk in order adjust the total or cumulative weight of the selected disks to be within a predetermined range.

In certain exemplary embodiments, the total or cumulative axial thickness of the selected disks may be measured prior to pressing. If the total or cumulative axial thickness of the selected disks is outside of a predetermined range, then exemplary embodiments can include those in which at least one selected disk is exchanged for another pre-selected disk in order adjust the total or cumulative axial thickness of the selected disks to be within a predetermined range.

The selected disks, such as a plurality of disks, can be pressed together by applying an axial compressive force to the plurality of disks using, for example, a mechanical or hydraulic vertical or horizontal press with, for example, an applied force ranging from about 10,000 to about 25,000 pounds. FIGS. 3A and 3B are, respectively, side views of a plurality of disks 102 prior to and subsequent to pressing according to embodiments disclosed herein. In FIG. 3A, the total or cumulative axial thickness of the plurality of disks 102 prior to pressing is indicated by $L_o$ and in FIG. 3B, the total or cumulative axial thickness of the plurality of disks 102 subsequent to pressing is indicated by $L_f$.

As can be seen by comparing FIG. 3A to FIG. 3B, the total or cumulative axial thickness of the plurality of disks 102 prior to pressing $L_o$ is greater than the total or cumulative axial thickness of the plurality of disks subsequent to pressing $L_f$. In this regard, a relationship between $L_o$ and $L_f$ can be defined as a compression ratio, which can be defined as:

$$\text{Compression ratio } (\%) = -100 \times \frac{(L_f - L_o)}{L_o}$$

For example, in certain exemplary embodiments the selected disks may be pressed together to achieve a compression ratio ranging from about 10 to about 30, such as from about 12 to about 28, and further such as from about 20 to about 25, including about 22.

This relationship can alternatively be described by expressing the total or cumulative axial thickness of the pressed disks $L_f$ as a percentage of the total axial thickness of the selected disks prior to pressing $L_o$. For example, in certain exemplary embodiments, the total axial thickness of the pressed disks $L_f$ ranges from about 70% to about 85%, such as from about 72% to about 83%, and further such as from about 75% to about 80% of the total axial thickness of the selected disks prior to pressing $L_o$.

For optimal roll quality, it is desirable that the compression ratio be within a predetermined range, such as the ranges disclosed herein. For example, if the compression ratio is too low, voids, gaps, and large pores may be present in unacceptable levels, especially in areas between the disks. Conversely, if the compression ratio is too high, disk cracking can result, which can potentially lead to catastrophic roll failure.

Following pressing the selected disks, such as a plurality of selected disks, together according to embodiments herein, methods according to embodiments disclosed herein may further comprise at least one of cutting, grinding, and sanding the pressed disks, such as a plurality of pressed disks, into a predetermined shape. The predetermined shape can be a function of the expected area of application of the heat-resistant roll, such as for application as a pulling roll or as an edge roll in a glass sheet processing method, such as a fusion draw down process.

Embodiments disclosed herein can enable highly reliable and consistent production of heat-resistant rolls with not only superior surface characteristics but also excellent and consistent hardness, such as heat-resistant rolls having a shore hardness at 25° C. of from about 30 to about 60.

While the above embodiments have been described with reference to a fusion down draw process, it is to be understood that such embodiments are also applicable to other glass forming processes, such as float processes, slot draw processes, up-draw processes, and press-rolling processes.

It will be apparent to those skilled in the art that various modifications and variations can be made to embodiment of the present disclosure without departing from the spirit and scope of the disclosure. Thus it is intended that the present disclosure cover such modifications and variations provided they come within the scope of the appended claims and their equivalents.

What is claimed is:

1. A method for making a heat-resistant roll comprising:
   pre-selecting a plurality of heat-resistant disks that each comprise a plurality of wrinkles, the pre-selecting based on at least one quality factor selected from the group consisting of a surface wrinkle density, a surface wrinkle spacing, a surface wrinkle depth, and a void density; and
   pressing a number of the plurality of pre-selected heat-resistant disks together, such that a ratio of a total axial thickness of the number of the plurality of pre-selected heat-resistant disks after pressing relative to a total axial thickness of the number of the plurality of pre-selected heat-resistant disks prior to pressing is within a predetermined range.

2. The method of claim 1, wherein the method further comprises firing the plurality of pre-selected heat-resistant disks.

3. The method of claim 1, wherein the number of the plurality of pre-selected heat-resistant disks are selected from the pre-selected plurality of heat resistant disks to provide each heat-resistant disk of the number of the plurality of pre-selected heat-resistant disks with an average axial thickness within a predetermined range prior to pressing.

4. The method of claim 3, wherein the predetermined range of the average axial thickness of each heat-resistant disk of the number of the plurality of pre-selected heat-resistant disks prior to pressing is from about 4 millimeters to about 8 millimeters.

5. The method of claim 3, wherein the number of the plurality of heat-resistant disks are selected from the pre-selected plurality of heat-resistant disks such that a difference between a largest average axial thickness of the average axial thicknesses of the number of the plurality of pre-selected heat-resistant disks and a smallest average axial thickness of the average axial thicknesses of the number of the plurality of pre-selected heat-resistant disks is less than about 10% of the largest average axial thickness.

6. The method of claim 1, wherein the number of the plurality of heat-resistant disks are selected from the pre-selected plurality of heat-resistant disks to provide a total weight of the number of the plurality of pre-selected heat-resistant disks within a predetermined weight range.

7. The method of claim 1, wherein the at least one quality factor comprises the surface wrinkle density, and each heat-resistant disk of the plurality of heat-resistant disks is pre-selected such that the surface wrinkle density of the plurality of wrinkles of each heat-resistant disk of the plurality of pre-selected heat-resistant disks is less than about 5 visible wrinkles for any 2,000 square millimeter surface area of the heat-resistant disk.

8. The method of claim 1, wherein the at least one quality factor comprises the surface wrinkle spacing, and each heat-resistant disk of the plurality of heat-resistant disks is pre-selected such that the surface wrinkle spacing of the plurality of wrinkles of each heat-resistant disk of the plurality of pre-selected heat-resistant disks is at least about 3 millimeters between closest visible wrinkles on the heat-resistant disk.

9. The method of claim 1, wherein the at least one quality factor comprises the surface wrinkle depth, and each heat-resistant disk of the plurality of heat-resistant disks is pre-selected such that the deepest visible wrinkle of the plurality of wrinkles on the surface of each heat-resistant disk of the plurality of pre-selected heat-resistant disks comprises a depth of less than about 0.3 millimeters.

10. The method of claim 1, wherein the at least one quality factor comprises the void density, and each heat-resistant disk of the plurality of heat-resistant disks is pre-selected such that the void density of each heat-resistant disk of the plurality of heat-resistant disks is less than two voids having a largest dimension of at least about 2 millimeters and less than five voids having a largest dimension of at least about 1 millimeter for every 10,000 square millimeters of surface area on the heat-resistant disk.

11. The method of claim 1, wherein the total axial thickness of the number of the plurality of pre-selected heat-resistant disks after pressing ranges from about 70% to about 85% of the total axial thickness of the number of the plurality of pre-selected heat-resistant disks prior to pressing.

12. The method of claim 1, wherein the number of the plurality of heat-resistant disks are selected from the pre-selected plurality of heat-resistant disks such that an average density of the number of the plurality of pre-selected heat-resistant disks ranges from about 0.6 grams per cubic centimeter to about 1.2 grams per cubic centimeter.

13. The method of claim 1, wherein each heat-resistant disk of the plurality of heat-resistant disks comprises a disk density, and the number of the plurality of pre-selected heat-resistant disks are selected from the pre-selected plurality of heat-resistant disks such that a difference between a highest disk density of the disk densities of the number of the plurality of pre-selected heat-resistant disks and a lowest disk density of the disk densities of the number of the plurality of pre-selected heat-resistant disks is less than about 10% of the highest disk density.

14. The method of claim 1, wherein each pre-selected heat-resistant disk of the plurality of pre-selected heat-resistant disks comprise a millboard material.

15. The method of claim 14, wherein the millboard material comprises at least one material selected from the group consisting of clay, mica, glass fibers, and cellulose fibers.

16. The method of claim 1, wherein a shore hardness at 25° C. of the heat-resistant roll formed after the pressing of the number of the plurality of pre-selected heat-resistant disks together ranges from about 30 to about 60.

17. The method of claim 1, wherein, after the pressing of the number of the plurality of pre-selected heat-resistant disks together, the method further comprises at least one of cutting, grinding, and sanding the number of the plurality of pressed pre-selected heat-resistant disks into a predetermined shape.

18. A method for making a heat-resistant roll comprising:
pre-selecting a plurality of heat-resistant disks that each comprise a plurality of visible wrinkles, the pre-selecting based on a surface wrinkle density and a surface wrinkle spacing, wherein each heat-resistant disk of the plurality of heat-resistant disks is pre-selected such that the surface wrinkle density of the plurality of visible wrinkles of each heat-resistant disk of the plurality of pre-selected heat-resistant disks is less than about 5 visible wrinkles for any 2,000 square millimeter surface area of the heat-resistant disk, and wherein each heat-resistant disk of the plurality of heat-resistant disks is pre-selected such that the surface wrinkle spacing of the plurality of visible wrinkles of each heat-resistant disk of the plurality of pre-selected heat-resistant disks is at least about 3 millimeters between closest visible wrinkles on the heat-resistant disk; and
pressing a number of the plurality of pre-selected heat-resistant disks together, such that a ratio of a total axial thickness of the number of the plurality of pre-selected heat-resistant disks after pressing relative to a total axial thickness of the number of the plurality of pre-selected heat-resistant disks prior to pressing is within a predetermined range.

19. The method of claim 18, wherein the pre-selecting the plurality of heat-resistant disks is further based on a surface wrinkle depth, and each heat-resistant disk of the plurality of heat-resistant disks is pre-selected such that the deepest visible wrinkle of the plurality of visible wrinkles on the surface of each heat-resistant disk of the plurality of pre-selected heat-resistant disks comprises a depth of less than about 0.3 millimeters.

20. The method of claim 18, wherein the pre-selecting the plurality of heat-resistant disks is further based on a void density, and each heat-resistant disk of the plurality of heat-resistant disks is pre-selected such that the void density of each heat-resistant disk of the plurality of heat-resistant disks is less than two voids having a largest dimension of at least about 2 millimeters and less than five voids having a largest dimension of at least about 1 millimeter for every 10,000 square millimeters of surface area on the heat-resistant disk.

21. The method of claim 18, wherein the total axial thickness of the number of the plurality of pre-selected heat-resistant disks after pressing ranges from about 70% to about 85% of the total axial thickness of the number of the plurality of pre-selected heat-resistant disks prior to pressing.

* * * * *